July 19, 1960     J. B. FREED ET AL     2,945,710
PUMPS
Filed Dec. 15, 1958
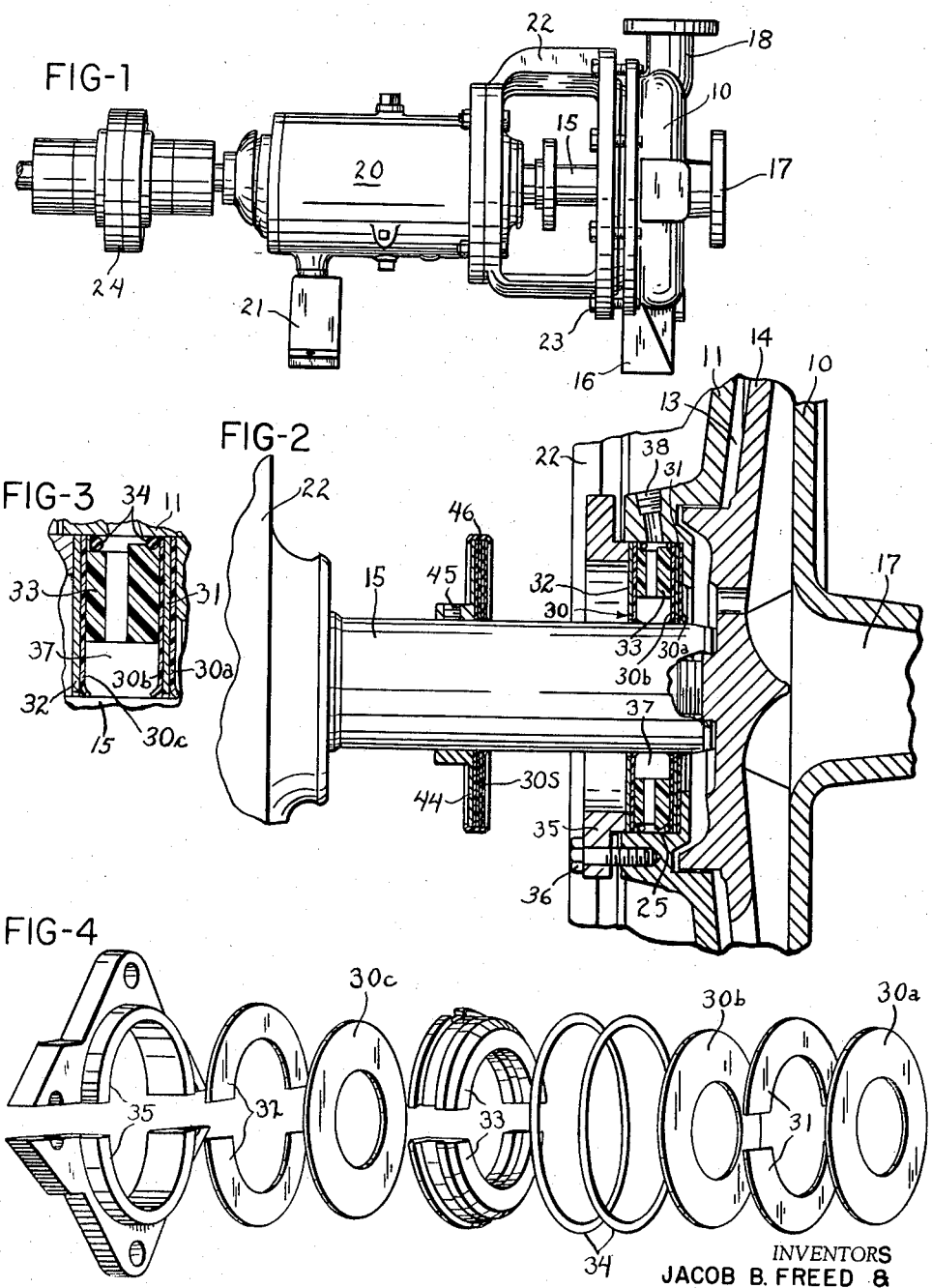
INVENTORS
JACOB B. FREED &
ROBERT F. SHARPE
BY
*Marechal, Biebel, French & Bugg*
ATTORNEYS United States Patent Office 2,945,710
Patented July 19, 1960

1

2,945,710
PUMPS

Jacob B. Freed and Robert F. Sharpe, Dayton, Ohio, assignors to The Duriron Company, Inc., Dayton, Ohio, a corporation of New York Filed Dec. 15, 1958, Ser. No. 780,467

3 Claims. (Cl. 286—8)

This invention relates to seals, and more particularly to rotary seal assemblies for use in pumps and like apparatus to seal the junction between a rotary shaft and a stationary casing.

It has been a generally conventional practice in pump manufacture to employ a stuffing box type of rotary seal assembly for the junction between the pump shaft and the pumping chamber, and while such seals are generally effective, they do tend to give rise to substantial friction and therefore to heat, and also they are not satisfactory for use in the handling of some types of corrosive liquids.

It is a primary object of the present invention to provide a rotary seal assembly suitable for use in place of a conventional stuffing box seal which is of considerably simpler construction, which will have minimum tendency to cause friction and heat while at the same time affording highly effective sealing, and which in addition is capable of use in direct contact with corrosive liquids of all types.

An additional object of the invention is to provide a rotary seal assembly having the characteristics outlined above which will seal equally effectively on a centrifugal pump over a wide pressure range including negative pressures.

A particular object of the invention is to provide a rotary seal assembly as outlined above wherein the sealing elements in engagement with the shaft are not compressed against the shaft by mechanical pressure to achieve their sealing action but are mechanically compressed against stationary structure to prevent leakage of pressure therebetween.

It is also an object of the invention to provide a rotary seal assembly as outlined above wherein the sealing is effected by a combination of lip sealing disks and spacers arranged in such relation that they are held in sealing engagement with the shaft by the same pressures which are being sealed against transfer along the shaft while presenting comparatively little sealing area in engagement with the shaft in order to minimize the frictional effects thereon.

Additional objects and advantages of the invention will be apparent from the following description, the accompanying drawings and the appended claims.

In the drawing—

Fig. 1 is a side elevational view showing a pump embodying a seal assembly constructed in accordance with the invention;

Fig. 2 is an enlarged fragmentary view in axial section illustrating in detail the seal construction in the pump of Fig. 2;

Fig. 3 is an enlarged fragment of Fig. 2; and

Fig. 4 is an exploded perspective view of certain of the component parts of the seal assembly of Fig. 2.

Referring to the drawing, which illustrates preferred embodiments of the invention, the pump in Figs. 1 and 2 comprises a housing formed by a pump casing 10 and

2 cooperating cover plate 11 defining the pumping chamber 13 in which the impeller 14 operates on the end of the drive shaft 15. The casing 10 is provided with a mounting bracket 16 welded thereto or otherwise forming a rigid part thereof, the inlet to the impeller chamber is shown at 17, and the outlet is shown at 18. The driving end of the shaft 15 is supported by suitably spaced bearings in a bearing housing 20 shown as provided with its own foot piece 21, and the bearing housing 20 is rigidly secured in spaced relation with the pump casing 10 by means of an adapter 22 of open or cage-structure which is bolted to flange portions of the housing 20 and casing 10 as shown at 23 in Fig. 1 and therefore leaves exposed for access the substantial length of the shaft 15 which lies between the casing cover plate 11 and the bearing housing 20. The driven end of the shaft 15 projects beyond bearing housing 20 as shown in Fig. 1 for connection by a coupling 24 to a suitable drive motor (not shown).

The present invention is particularly directed to the sealing of the junction between the shaft 15 and the cover plate 11 which forms the rear of the pump casing. The plate 11 is constructed with a cylindrical cavity 25 through which the driving end of the shaft 15 projects in generally concentric relation to support the impeller 14, the adapter 22 being constructed and arranged to establish and maintain this relationship of the shaft and casing. A conventional arrangement for this sealing purpose would call for one or more packing rings which would be compressed by a gland against the annular shoulder 26 at the inner end of the cavity 25 and would thereby be expanded radially into sealing engagement with the shaft 15 and the cylindrical wall of the cavity 25. The present invention provides a rotary seal assembly of special design which offers equal or superior sealing as compared with such stuffing box seals while developing notably less friction, and at the same time this seal assembly of the invention can be serviced, including the replacement of new sealing members, without separating the shaft either from the bearing housing 20 or from the pump casing, and in fact without opening up the pump casing at all.

Referring particularly to Figs. 2 and 3, the seal assembly includes a plurality of annular sealing disks indicated generally as 30 and individually as 30a, 30b and 30c. These sealing disks are of identical construction and are formed of a suitably flexible material such particularly as one of the fluorocarbon resins sold under the trade name Teflon. In addition, the disks 30 are initially of substantially smaller inner diameter than the shaft 15 for expansion and deflection of their inner marginal portions into annular lips overlying the shaft 15 in sealing engagement therewith, and the individual disks 30 are accordingly relatively thin to facilitate this action. For example, satisfactory results have been obtained with a shaft 2⅛ inches in diameter if the disks 30 are 1/32 inch in thickness and 1⅞ inches in inner diameter, and the desired expansion and deflection of each disk to form a lip as shown is effected by drawing the disk axially over the end of the shaft.

The sealing disks 30 are mounted in the cavity 25 in spaced relation with each other by means of spacer disks 31 and 32, which may be formed of a suitably rigid corrosion resistant alloy, and a seal cage 33 which may be formed of such alloy or a Teflon resin. The spacer 31 is mounted between the inner pair of sealing disks 30a and 30b, the cage 33 is mounted between the sealing disks 30b and 30c, and the spacer 32 is mounted on the axially outer side of the sealing disk 30c. The spacers 31 and 32 are each of relatively slightly greater inner diameter than the diameter of the shaft 15 to support their associated sealing disks in close proximity to the lip portions thereof, and satisfactory results have been obtained with the other parts of the dimensions noted above if the spacers 31 and 32 each have an inner diameter of 2¼ inches.

The seal cage 33 has its outer diameter of such relation to the diameter of the cavity 25 that it is readily maintained in sealed relation with the cavity wall by means of O-rings 34 arranged as shown, and the seal assembly is completed by a gland member 35 which is secured to the cover plate 11 by bolts 36 to compress all of the other members together while establishing sealing engagement between the shoulder 26 and a portion of the axially inner surface of the sealing disk 30a. The seal cage 33 is of substantially larger inner diameter, however, than the shaft 15 to provide a corresponding annular compartment 37 surrounding the shaft and between the disks 30b and 30c, satisfactory results having been obtained in the above specific example with an inner diameter of 4 inches for the cage 33.

In the normal operation of the pump, the pumping chamber 13 is under superatmospheric pressure, and since the disk 30a is arranged as shown with its lip portion turned inwardly of the chamber 13, this pumping pressure will hold the sealing lip in maintained sealing engagement with the shaft 15. At the same time, since the disk 30b has its lip portion turned outwardly of the chamber 13 and facing the compartment 37, this lip portion will similarly be held in sealing engagement with the shaft so long as the pressure within the compartment 37 is positive. If, however, the pressure within the compartment 37 is less than that in the pumping chamber and the disk 30a should wear away or otherwise fail, leakage could result between the disk 30b and the shaft, and it is therefore preferred to maintain the compartment 37 filled with a lubricant or other fluid by way of the charging port 38 at a pressure at least slightly in excess of the maximum pressure normally developed within the pump in chamber 13.

Under the above operating conditions, the disk 30c has its lip portion turned inwardly of the compartment 37 to prevent outward escape of the pressure therefrom, and thus the three disks cooperate to prevent transfer of pressure along the shaft in either direction. Even if a negative pressure should develop in the pumping chamber 13, the seal assembly of the invention would still prevent transfer of pressure into the pumping chamber from outside, since the disk 30b would under such conditions be forced even more firmly into sealing engagement with the shaft. At the same time, however, the actual area of each disk which is in engagement with the shaft is very small, amounting to only a fraction of an inch in the axial dimension, so that the friction between the disks and the shaft is correspondingly small, and this result is especially facilitated when the disks are formed of the Teflon materials noted above since these materials possess especially high properties of freedom from friction. These Teflon materials also have the advantage of substantially complete chemical inertness, which makes them further desirable in the seal of assembly of the invention as applied to a pump for handling corrosive liquids.

In addition to the sealing disks 30 within the cavity 25, the invention provides a reserve supply of identical sealing disks 30s at a location such that they are retained free from wear during operation of the pump but can be readily moved into sealing position replacing worn disks 30 from within the cavity 25 without disassembling any parts of the pump or shaft mounting. Referring again to Fig. 2, these spare sealing disks 30s are maintained on the exposed portion of the shaft 15 within the adapter 22 by means of a disk 44 fixed on the shaft by a set screw 45 and carrying a retainer ring 46 of channel-shaped section proportioned to overlap the outer peripheries of the disks 30s in releasable frictional relation, satisfactory results having been obtained with this retainer ring 46 formed of a resiliently flexible material such as neoprene.

In the assembly of this pump, the disk 44, its associated retainer ring 46 and all of the sealing disks 30 are slipped over the driving end of the shaft 15 before the cover plate 11 and impeller 14 are mounted in place. Then after assembly of the pump parts is completed, the desired number of disks 30 are slid along the shaft into the cavity 25 in properly alternating relation with the spacers 31 and the seal cage 33. The two-piece gland 35 is then mounted in place to complete the seal assembly, and the spare sealing disks 30s are forced into the desired retained relation with the retainer ring 46.

During subsequent operations of the pump, the disks 30a—30c perform their desired sealing function between the cover plate 11 and the shaft 13, but the spare disks 30s simply rotate with the shaft but in stationary relation with the surface of the shaft so that they are not subject to any wear. Thereafter, when any of the disks 30 which have been in use become worn sufficiently to require replacement, it is merely necessary to remove the gland 35, spacers 31 and seal cage 33 by lifting them out and away from the cavity 25, and to cut or tear away the worn disks 30. The necessary number of new disks 30s may then be slid along the shaft into the cavity 25, with the spacers 31 and seal cage 33 being replaced in proper order. All of these steps can be performed by reaching into the interior of the adapter 22 so that after the gland 35 has been replaced and bolted in position, the servicing of the seal assembly is complete and the pump is ready for further use.

Cross reference is made to our copending application Serial No. 749,118, filed July 17, 1958, of which the present application is a continuation-in-part.

While the apparatus herein described constitute preferred embodiments of the invention, it is to be understood that the invention is not limited to this precise form of apparatus, and that changes may be made therein without departing from the scope of the invention which is defined in the appended claims.

What is claimed is:

1. A rotary seal assembly for the junction between a rotary shaft and the wall of a housing enclosing a chamber wherein the pressure may be different from atmospheric pressure, comprising means defining a cavity in the outer surface of said wall having an annular shoulder at the inner end thereof receiving said shaft therethrough, a pair of thin sealing disks of deformable material received over said shaft and of smaller initial inner diameter than the diameter of said shaft for expansion and deflection of the inner marginal portions thereof into annular lips overlying said shaft in sealing engagement therewith, said disks having said lips turned in opposite directions away from each other to prevent transfer of differential pressure along said shaft from either side of said pair of disks to the other side thereof, an annular spacer of rigid material received between said disks and of slightly greater inner diameter than the diameter of said shaft to support said disks in close proximity to said lips, a third sealing disk of deformable material received over said shaft outwardly of said pair of disks and including a similar annular lip facing said pair of disks in sealing engagement with said shaft, an annular cage received between said third disk and said pair of disks and of substantially larger inner diameter than the diameter of said shaft for cooperation therewith and with the adjacent said disks to define an annular compartment overlying said shaft, means supporting said third disk in close proximity to said lip thereon and for clamping all of said disks and said spacer and said cage against said shoulder with the innermost said disk having a portion of the inner surface thereof in sealing engagement with said shoulder, and means for supplying fluid to said compartment at a pressure greater than atmospheric pressure to maintain said lips on said third disk and the outer of said pair of disks in sealing engagement with said shaft.

2. A rotary seal assembly for the juncton between a rotary shaft and the wall of a housing enclosing a chamber wherein the pressure may be different from atmospheric pressure, comprising means defining a cavity in the outer surface of said wall having an annular shoulder at the inner end thereof receiving said shaft therethrough, a pair of thin sealing disks of deformable material received over said shaft and of smaller initial inner diameter than the diameter of said shaft for expansion and deflection of the inner marginal portions thereof into annular lips overlying said shaft in sealing engagement therewith, said disks having said lips turned in opposite directions away from each other to prevent transfer of differential pressure along said shaft from either side of said pair of disks to the other side thereof, a first annular spacer of rigid material received between said disks and of slightly greater inner diameter than the diameter of said shaft to support said disks in close proximity to said lips, a third sealing disk of deformable material received over said shaft outwardly of said pair of disks and including a similar annular lip facing said pair of disks in sealing engagement with said shaft, an annular cage received between said third disk and said pair of disks and of substantially larger inner diameter than the diameter of said shaft for cooperation therewith and with the adjacent said disks to define an annular compartment overlying said shaft, a second annular spacer similar to said first spacer received over said shaft outwardly of said third disk to support said third disk in close proximity to said lip thereon, means for clamping all of said disks and said spacers and cage against said shoulder with the innermost said disk having a portion of the inner surface thereof in sealing engagement with said shoulder, and means for supplying fluid to said compartment at a pressure greater than atmospheric pressure to maintain said lips on siad third disk and the outer of said pair of disks in sealing engagement with said shaft.

3. A rotary seal assembly for the junction between a rotary shaft and the wall of a housing enclosing a chamber wherein the pressure may be different from atmospheric pressure, comprising means defining a cavity in the outer surface of said wall having an annular shoulder at the inner end thereof receiving said shaft therethrough, a pair of thin sealing disks of a deformable fluorocarbon material received over said shaft and of smaller initial inner diameter than the diameter of said shaft for expansion and deflection of the inner marginal portions thereof into annular lips overlying said shaft in sealing engagement therewith, said disks having said lips turned in opposite directions away from each other to prevent transfer of differential pressure along said shaft from either side of said pair of disks to the other side thereof, an annular spacer of rigid material received between said disks and of slightly greater inner diameter than the diameter of said shaft to support said disks in close proximity to said lips, a third sealing disk of said fluorocarbon material received over said shaft outwardly of said pair of disks and including a smaller annular lip facing said pair of disks in sealing engagement with said shaft, an annular cage received between said third disk and said pair of disks and of substantially larger inner diameter than the diameter of said shaft for cooperation therewith and with the adjacent said disks to define an annular compartment overlying said shaft, means including an annular gland member received over said shaft outwardly of said third disk for supporting said third disk in close proximity to said lip thereon and for clamping all of said disks and said spacer and said cage against said shoulder with the innermost said disk having a portion of the inner surface thereof in sealing engagement with said shoulder, and means for supplying fluid to said compartment at a pressure greater than atmospheric pressure to maintain said lips on said third disk and the outer of said pair of disks in sealing engagement with said shaft.

References Cited in the file of this patent
UNITED STATES PATENTS

| | | |
|---|---|---|
| 1,962,380 | Biggs | June 12, 1934 |
| 2,675,258 | Dutton-Forshaw | Apr. 13, 1954 |
| 2,887,331 | Johnson | May 19, 1959 |

FOREIGN PATENTS

| | | |
|---|---|---|
| 851,630 | Germany | Oct. 6, 1952 |